H. SMALL.
CARBURETER.
APPLICATION FILED DEC. 28, 1904.

900,604.

Patented Oct. 6, 1908.

5 SHEETS—SHEET 1.

WITNESSES:
J. F. Small
H. W. Mosley

INVENTOR
Howard Small
By Rector & Hibben
HIS ATTORNEYS

H. SMALL.
CARBURETER.
APPLICATION FILED DEC. 28, 1904.

900,604.

Patented Oct. 6, 1908.
5 SHEETS—SHEET 2.

WITNESSES:
J. F. Small
H. W. Mosley

INVENTOR
Howard Small
By Rector & Hibben
HIS ATTORNEYS

H. SMALL.
CARBURETER.
APPLICATION FILED DEC. 28, 1904.

900,604.

Patented Oct. 6, 1908.
5 SHEETS—SHEET 3.

WITNESSES:
J. F. Small
H. W. Mosley.

INVENTOR
Howard Small
By Rector & Hibben
HIS ATTORNEYS

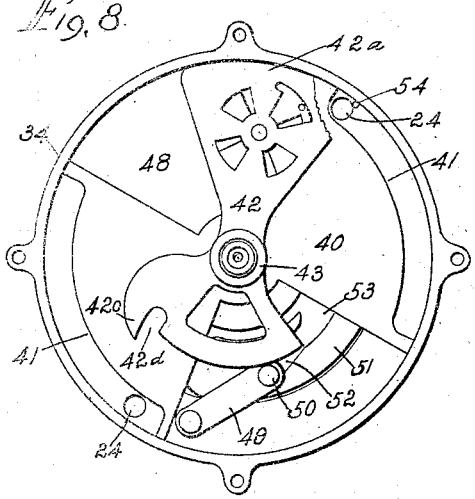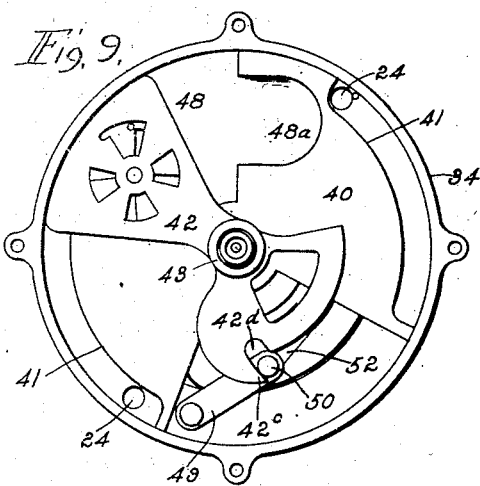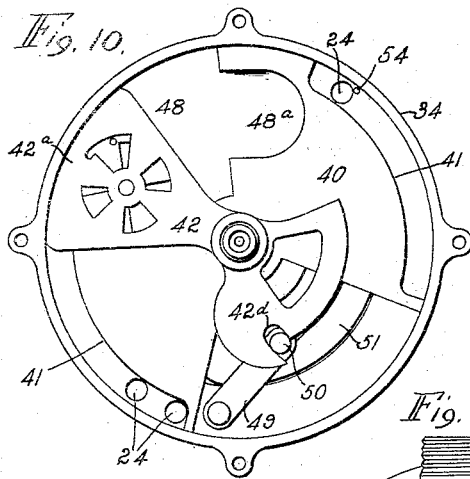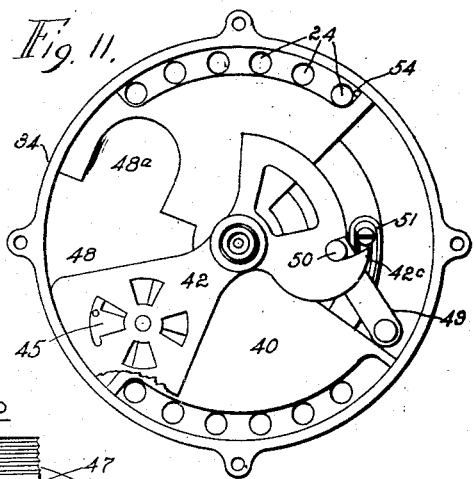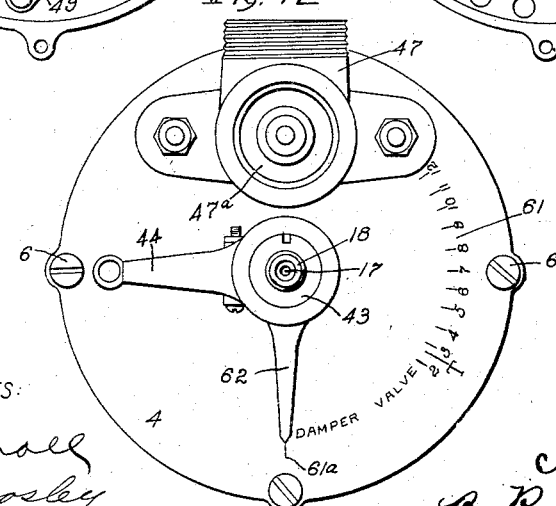

H. SMALL.
CARBURETER.
APPLICATION FILED DEC. 28, 1904.
900,604.
Patented Oct. 6, 1908.
5 SHEETS—SHEET 5.
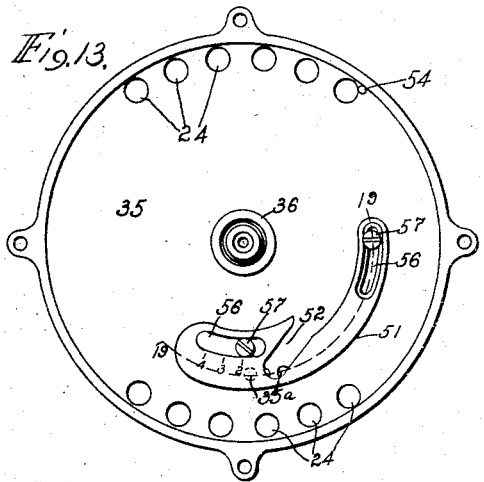
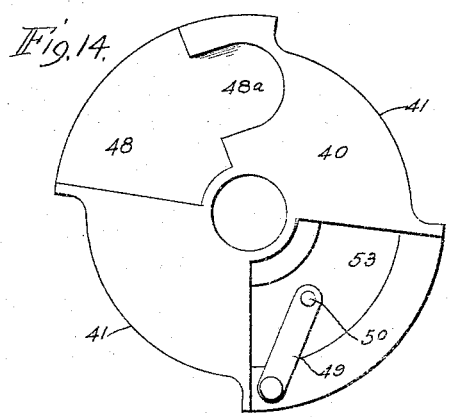
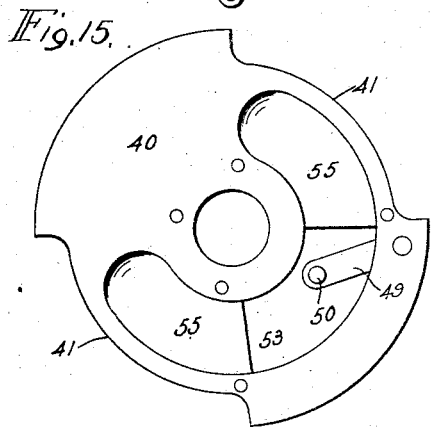
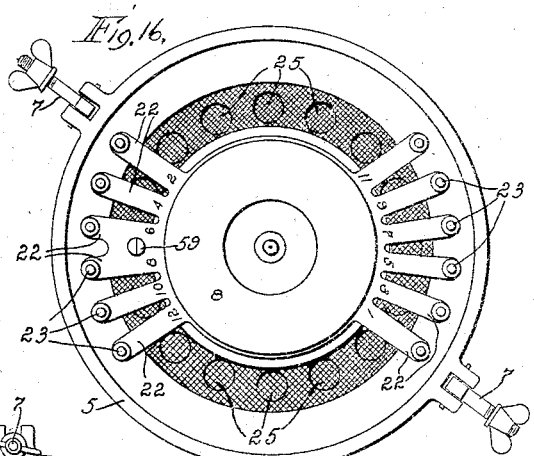
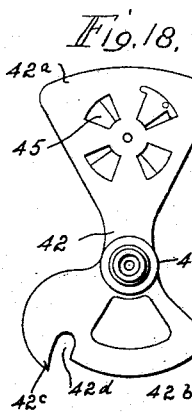
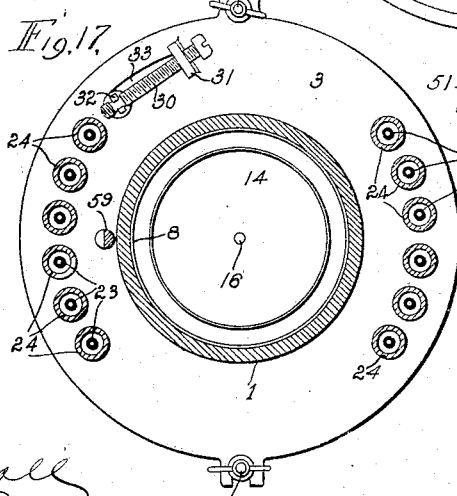
WITNESSES:
J. F. Small
H. W. Mosley
INVENTOR
Howard Small
By Rector & Hibben
HIS ATTORNEYS

UNITED STATES PATENT OFFICE.

HOWARD SMALL, OF CHICAGO, ILLINOIS, ASSIGNOR TO JOHN W. DUNTLEY AND WILLIAM O. DUNTLEY, OF CHICAGO, ILLINOIS.

CARBURETER.

No. 900,604.    Specification of Letters Patent.    Patented Oct. 6, 1908.

Application filed December 28, 1904. Serial No. 238,600.

*To all whom it may concern:*

Be it known that I, HOWARD SMALL, residing at Chicago, in the county of Cook and State of Illinois, have invented certain new and useful Improvements in Carbureters, of which the following is a specification.

My invention relates to what are generally known as carbureters, which are employed in connection with explosion engines or gasolene motors or the like, for the purpose of producing carbureted gas from the fuel, which is generally gasolene.

The object of my invention is to produce an efficient and reliable device of this character for general use in connection with explosion engines or motors and having special capabilities in connection with the explosion engines or gasolene motors of automobiles.

One of the main features of my invention relates to a series or plurality of vaporizing nozzles, which may be of any desired capacity or be varied according to the particular type or requirements of motor, together with a corresponding series of mixing tubes or chambers with which said nozzles coöperate and which are governed by the valve mechanism.

A second main feature of my invention relates to novel and efficient valve mechanism for throttling the production and flow of carbureted gas and for cutting the nozzles and mixing chambers or tubes in or out of action, with the result that any desired number of these nozzles may be made effective.

A third main feature of my invention relates to the novel and compact form of construction and the arrangement whereby the fuel chamber is placed centrally or substantially so, with the vaporizing nozzles and mixing tubes grouped therearound and in substantially close relation thereto.

Other features of advantage and utility of my carbureter will be apparent from the description hereinafter given.

Figure 1:
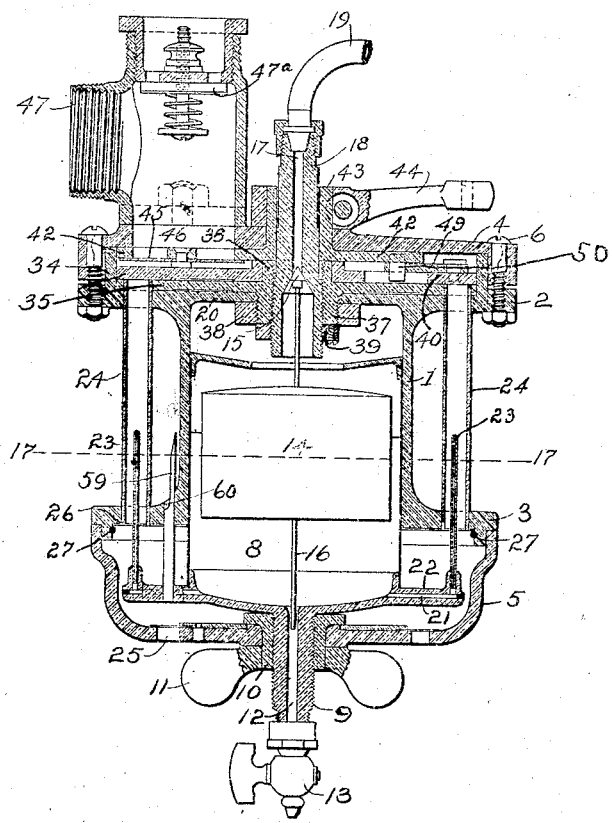
Figure 2:
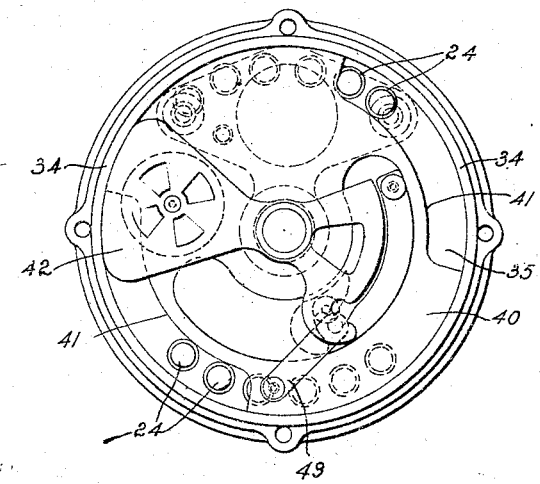
Figure 3:
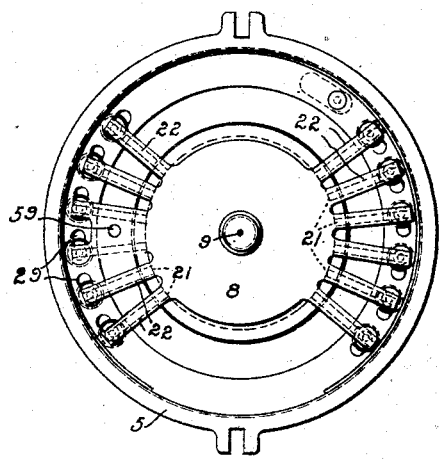
Figure 4:
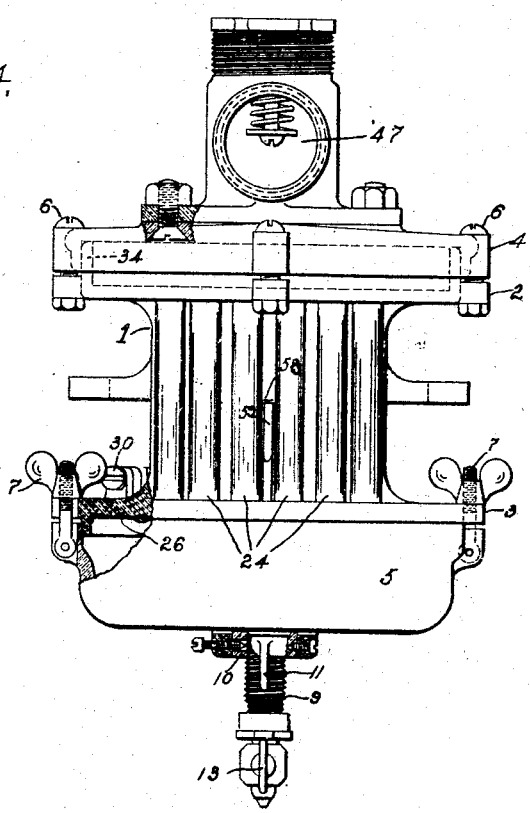
Figure 5:
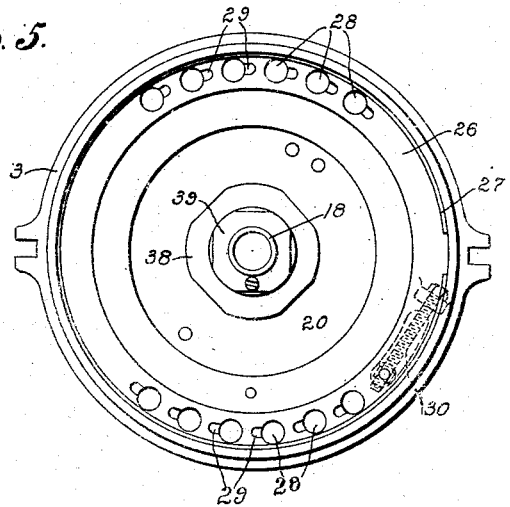
Figure 6:
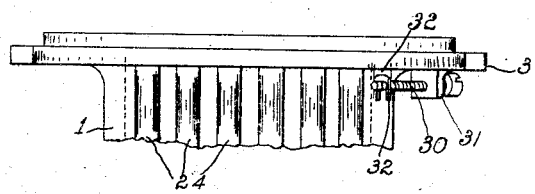
Figure 7:
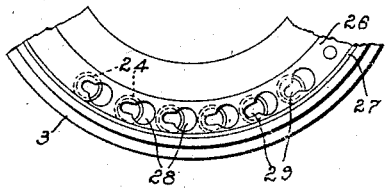

In the drawings, Figure 1 is a central vertical section of my carbureter; Fig. 2 a plan view thereof with the upper cap removed: Fig. 3 a bottom plan view of the carbureter with the lower cap removed; Fig. 4 a side elevation of the carbureter; Fig. 5 a bottom plan view of the carbureter with the cap and fuel chamber removed; Figs. 6 and 7 detail views of the parts illustrated in Fig. 5; Figs. 8 to 11 detail views showing different positions of the valve mechanism; Fig. 12 a plan view of the carbureter; Fig. 13 a plan view of the carbureter with the upper cap and valve mechanism removed; Figs. 14 and 15 top and bottom plans respectively of the main valve; Fig. 16 a top plan of the fuel chamber and lower cap as removed from the remainder of the carbureter; Fig. 17 a section on the line 17—17 of Fig. 1; Fig. 18 a detail view of the supplemental valve, and Fig. 19 a section on the line 19—19 of Fig. 13.

My carbureter in the present instance has a cylindrical shell or casing 1 provided with outwardly extending end flanges 2 and 3 respectively arranged at the top and bottom thereof. These flanges constitute means of attachment for the top and bottom caps 4 and 5 respectively, and in the particular embodiment of my invention now being described the top cap 4 is bolted to its flange 2 by the plain bolts 6, while the bottom cap 5 is fastened to its flange 3 by the swinging clamping bolts 7, which construction or arrangement is not the necessary or essential one, but the preferred.

Within the shell or casing and preferably centrally thereof is arranged a vertically movable or adjustable receptacle or chamber 8 for the gasolene or other fuel, and therefore hereinafter termed the fuel chamber. This chamber has a downward tubular extension 9, which is screw threaded to fit and screw into a flanged nut 10 inserted in a central opening in the lower cap 5 and free to rotate therein. This nut, whose flange bears against the inner face of the cap 5, is fixed with respect to longitudinal or vertical movement and is adapted to move and hold the fuel chamber to different relative positions or heights to which it may be moved by its rotation. For hand manipulation, the lower or outer end of the nut is provided with the thumb piece 11, removably secured thereto in suitable manner. The extension 9 is provided with a drain passage 12 governed by a pet cock 13 or the like, secured to the lower end of such extension.

A float 14 is arranged within the fuel chamber and provided with an upwardly extending stem terminating in a needle valve 15 and with a depending stem or rod 16 which enters and is guided by the drain passage 12, such passage thus having the additional function of a guide way.

The needle valve 15 governs the admission of the fuel from a suitable source of storage or supply into the fuel chamber, and to this end such valve seats against the lower end of a feed passage 17 formed in a supply or feed pipe 18. This feed pipe communicates at its outer end with the source of fuel supply through the medium of a pipe 19 which may be flexible or not according to the particular place or requirements of use of the carbureter. The inner end of the fuel pipe extends towards the fuel chamber 8 and communicates therewith, such pipe, in the present instance, passing through a central opening in a top plate 20 forming the upper end of the space which contains said chamber.

The upper end of the fuel chamber is closed except for a central opening through which the valve stem passes and through which the fuel flows as admitted by the valve. It will be understood that the float 14 falls with the level of the fuel and thereby automatically admits more fuel until the consequent rising of the float seats the valve, whereupon no more fuel can be admitted, even though the supply thereof is under pressure.

As indicated in Figs. 1, 3 and 16, the fuel chamber is provided near its lower end with a plurality of lateral and substantially horizontal or radial passages 21 which, in the present instance, are formed in a plurality of separate extensions 22, although the particular construction in this respect is not material so long as the passages are properly provided.

The horizontal passages 21 communicate with a corresponding series of vertical vaporizing nozzles or jets 23, which in the present instance are arranged concentrically and in two separate groups on opposite sides of the fuel chamber and casing for a purpose hereinafter made apparent. These fuel nozzles are adapted to be removably secured to the extensions or pipes 22 and the same, as herein shown, screw thereinto. Moreover, the diameter of the bore of these nozzles may be different in the several nozzles and each group may, if desired, have nozzles with different diameters of bore.

The proper diameter of nozzle and the proper relative location of the different sizes thereof in each group for the most perfect operation are dependent upon the type and character of the particular motor in connection with which the carbureter is employed and may be readily determined, with the result that after these factors are ascertained for a given character of motor, carbureters similarly constructed as to the vaporizing jets will work properly with all motors of that character. In the present instance, I have shown twelve of these nozzles or jets in two groups of six each, but it is evident that the number thereof may be varied as desired. Furthermore, the arrangement of these nozzles or jets is such that they are cut into or out of operation by the throttle valve (hereinafter described) in reverse order in the two groups, and alternately. The members of one set or group are numbered with the odd numbers 1, 3, 5, 7, 9 and 11, while the members of the other group bear the even numbers 2, 4, 6, 8, 10 and 12, these numbers being applied on the tubes or extensions 22 at the base of the nozzles, as indicated in Fig. 16. As shown, the order of numbering of the two groups is the reverse, and as hereinafter explained the nozzles are cut into or out of operation alternately in the two groups, that is to say, nozzle 1 at the lower right hand end of the first group and nozzle 2 at the upper left hand end of the second group being both in commission, opening of the throttle valve first cuts in nozzle numbered 3 of the first group, then nozzle numbered 4 of the second group, and so on alternately.

The nozzles or jets project upwardly partway of a corresponding series of vertical mixing chambers or tubes 24 secured at their ends in the two flanges 2 and 3 of the main casing or shell 1, the upper ends of such tubes being controlled by a throttle valve and their lower ends communicating with the space formed by the lower cap 5 which is open to the atmosphere through the preferably-screened series of openings 25. The supply of air through these mixing tubes is governed by special means (illustrated in detail in Figs. 5, 6 and 7) which, in the present instance, comprises a flat circular plate or ring 26 concentric with the inlet or lower ends of the mixing tubes which it governs and bearing against the lower face of the flange 3. In practice this ring is held in place by means of a spring rod or wire 27. This ring has openings 28 in two groups at opposite sides corresponding with the lower ends of the mixing tubes, which openings have side slots 29 to accommodate the vaporizing nozzles when the ring is moved or adjusted to a position to close or substantially close the mixing tubes. This air controlling device is adjusted in suitable manner from a point outside the carbureter, and as therein shown this adjustment is accomplished by means of a screw 30 screwing into a fixed lug 31 projecting upwardly from the lower flange 3 and bearing loosely in but engaging a lug 32 forming part of or secured to the ring 26 and projecting through a circular slot 33 in such flange, all as clearly illustrated in Figs. 4, 5, 6 and 17. Rotation of the screw in one direction or the other adjusts the ring 26 accordingly and increases or decreases the supply of air to the mixing tubes, as the case may be.

The throttle valve mechanism, as shown, for governing the flow of the carbureted gas as well as the production of such gas, is arranged at the upper or delivery ends of the mixing tubes and in a space formed between the upper cap 4 and the upper end of the casing or shell. In the present instance the lateral flange 2 is provided with a vertical marginal flange 34 upon which the cap 4 rests to form the space just referred to.

A flat plate or disk 35, through which the two groups of mixing tubes extend, is arranged upon the upper face of the shell and provided with a central opening flanged on both sides, the upper flange 36 constituting a hub and the lower flange 37 being externally screw threaded to screw into the central opening of the top plate 20 and held thereto by the nut 38 and locked by nut 39. This central opening of the disk 35 is screw threaded to receive the feed pipe 18, hereinbefore described.

The plate or disk 35, mounted on the hub or flange 36, forms a seat for the main throttle valve 40 which is in form a disk having marginal and also surface recesses as indicated in Figs. 14 and 15. The marginal recesses 41 of this valve are arranged at opposite sides but such valve at other points has a full diameter equaling the diameter of the space within the marginal flange 34. The position and depth of these marginal recesses are such that one or more of the mixing tubes will be uncovered by the disk valve according to its particular position.

By preference, two of the mixing tubes are open or uncovered when the valve is in normal position, that is extreme in one direction, and by preference the arrangement is such that upon movement of the valve in the other direction the mixing tubes will be opened or uncovered one at a time until all of them are opened, although it is possible to arrange for the opening of two tubes at a time, that is, one on each side simultaneously. The preferred arrangement, however, provides the better regulation.

To operate the main valve and also to completely throttle the carbureter, I provide a supplemental valve 42, illustrated separately in Fig. 18 and in connection with the main valve in Figs. 8 to 11, more particularly. This valve 42 is in the form of a flat plate shaped as two segments 42$^a$ and 42$^b$ of a circle on opposite sides of a hub 43 which extends through the top cap 2 and is operatively connected with the controlling lever 44 actuated or manipulated by the operator.

The segment 42$^a$ of the supplemental valve is provided with a valve which, as shown, is a circular damper valve 45 capable of adjustment in any convenient manner whereby provision is made for a flow of carbureted gas notwithstanding that the main and supplemental valves are in their normal position, the amount of such flow being capable of regulation by the damper valve and made sufficient for "turning over" the motor engine and keeping it running. This particular segment 42$^a$ thus controls the gas through the outlet 46 in the cap 4 communicating with the outlet nozzle 47.

The supplemental valve 42 slides over the face of the main valve and passes over the surface recess 48 of a circular segmental shape and having the side recess 48$^a$ (Fig. 14). The thickness of the valve 42 is such that, when such valve is in closed position, the gas is compelled to pass through the recess 48, 48$^a$, and through the damper valve to the outlet.

The supplemental valve is operatively connected with the main valve and to this end and according to the construction shown, the main valve is provided with a link 49 pivoted at one end thereto near its periphery and at its other end having a stud 50 extending laterally on both sides. The lower end of the stud coöperates with means for locking the main valve in normal position, such means, as herein shown, consisting of a curved strip or plate 51 adjustably secured to the valve seat 35 on an arc described from the center thereof and provided with an angular slot 52 adapted to receive the lower end of the stud, as indicated in Figs. 8, 9 and 13.

Normally the stud, which projects through a slot 53 in the main valve, is positioned within its slot, with the result that such valve is locked against rotation. Moreover, this stud is kept within, as well as removed from, its slot 52 by the valve 42 whose segment end 42$^b$ coöperates therewith for that purpose. The curved face of this particular segment normally bears against the upper end of the stud to keep it within its slot but for withdrawing such stud therefrom and moving the main valve one corner of such segment is fashioned into a hook 42$^c$ and a short substantially radial slot 42$^d$. This hook projects into the path of the stud 50 and when moved is adapted to take up and move the same inwardly to thereby withdraw it from the slot. The supplemental valve is thus enabled to normally lock the main valve and also to unlock and actuate the same. The movement of the main valve to open position is limited by the contact of one end of one of the recesses 41 with a stop pin 54 (Fig. 13) projecting above the face of the valve seat.

The main valve has on its under side a curved recess or cavity 55 which accommodates the plate 51 and also coöperates therewith to stop the movement of the main valve in its clockwise direction (Figs. 8 to 11).

As hereinbefore stated, the plate 51 is adjustable, which is for the purpose of varying the degree of movement of the main valve and thereby causing such valve, when at normal position, to leave uncovered any predetermined number of tubes. According to the construction herein shown, the plate 51 is provided near its ends with curved slots 56 receiving screws or studs 57 which screw into the valve seat. By adjusting the plate in one direction or the other more or less of the tubes are permitted to be open when the main valve is in normal position and in order to indicate the particular number of holes thus left open according to the particular adjustment, I mark on the plate adjacent one of the slots the numbers 2, 3 and 4 (Fig. 13), thereby indicating that when the screw 57 is opposite any one of these numbers, a corresponding number of tubes will be left open. For instance, according to the adjustment illustrated in the drawings, two holes will be left open and consequently the number 2 appears opposite the stud 57. It will be understood that, as hereinbefore mentioned, this plate forms a stop for the main valve in one direction of movement and hence the adjustment of such plate in one direction or the other so changes the position of the stop as to increase or decrease the degree of partial rotation or oscillation of such valve.

In order that the plate 51 may be adjusted with accuracy to its different positions for opening or closing more or less of the plurality of tubes, I provide for a pin and hole connection between the adjustable plate 51 and the end plate 35. In the present instance, as clearly disclosed in Figs. 13 and 19 of the drawings, I provide the plate 35 with a series of holes 35$^a$ and provide the adjustable plate 51 with a depending stud or pin 51$^a$ which in Fig. 19 is shown as positioned in the outermost hole on the left. In the adjustment of the plate 51 the pin 51$^a$ is removed or withdrawn from whatever hole it may happen to be in and then inserted in the proper hole 35$^a$ according to the desired adjustment of the plate 51. Consequently, the number of tubes left open and the number of vaporizing nozzles or jets rendered effective when the main valve is in normal position may be varied, as desired or as found necessary. Under the present construction herein described, and according to the particular adjustment shown, the main valve when in normal position leaves two tubes open or uncovered and when moved opens the remaining tubes one at a time and alternately from opposite sides. It is obvious, however, that the arrangement might be such that the main valve shall normally leave one tube open or shall open tubes on opposite sides simultaneously instead of alternately.

The gas outlet nozzle 47 is preferably provided with a spring pressed check valve 47$^a$, as indicated in Fig. 1, for the purpose of permitting air to be drawn or sucked in on the inspiration stroke of the motor whenever the valves should be substantially shut off, thereby preventing the flow of any gas or air through the carbureter. However, this feature is not essential.

In practice, when the main and supplemental valves are closed, the damper valve 70 is slightly open to permit the flow of enough gas to "turn over" the motor and keep it running slowly, the amount of which flow can be regulated by the damper valve. This position is illustrated in Fig. 8. It being borne in mind that, according to the adjustment illustrated, two of the tubes are open, the first movement of the supplemental valve will open the outlet port 46 (Fig. 1) and the motor will draw the gas through the surface recess 48, 48$^a$ beneath such valve and then through such outlet port. Two of the tubes and vaporizing nozzles or jets are now in full service and supplying gas to the motor, as shown in Fig. 9. Furthermore, as seen in Fig. 8, the main valve remains locked against movement by reason of the fact that, at this time, the segment portion 42$^b$ of the supplemental valve bears against the stud 50 and keeps it in the slot 52 of the plate 51, with the result that the main valve is locked to that plate and consequently locked against movement. Continued movement of the supplemental valve brings its hook 42$^c$ and slot 42$^d$ into coöperation with the stud 50, (Fig. 9) with the result that the further movement of such valve withdraws the stud from its slot, as seen in Fig. 10, and by reason of the engagement of that valve with the main valve through the medium of the link 49, the latter valve is taken up by and carried with the first valve 42 in its anti-clockwise movement. The result of the movement is to open the tubes singly and alternately in the two groups and thereby bring additional nozzles or jets into service. The movement of the valves may be continued until the main valve is stopped by the pin 54, at which time full opening is had, inasmuch as all the tubes (twelve in the present instance) are open, as clearly illustrated in Fig. 11.

It will be understood that the amount of air permitted to enter the lower ends of the tubes may be regulated by the ring 26, hereinbefore described, for the purpose of controlling or varying the richness of the gas or vapor.

The particular fuel line or level maintained by the carbureter is determined in suitable manner, as by means of a tube or hose which may be temporarily attached to the drain passage of the fuel chamber. This is done just after the parts are assembled and when the chamber is in its lowermost position. When the fuel level is thus determined, the same is suitably indicated, as by means of a point, scratch or horizontal line on the outside of the casing or shell, as indicated at 58 in Fig. 4. With this line coöperates a vertical gage rod 59, which is secured to one of the lateral extensions or pipes 22 and rises upward to the same height as the vaporizing nozzles or jets. This gage rod is so positioned as to pass through a hole 60 in the flange 3 (Figs. 1 and 5) and close to the outer side or surface of the shell 1. This rod indicates to the operator the exact plane of the ends of the nozzles or jets, which are concealed in their tubes when the parts are assembled, and enable him to adjust these jets with relation to the fuel level. It will be understood that all carbureters made exactly the same will have the same fuel level which can be indicated, as described, without the necessity of individual determination.

The adjustment of the vaporizing nozzles or jets with regard to the fuel level is accomplished by the rotation of the nut 10 and the consequent raising or lowering, as the case may be, of the fuel chamber, in the manner already explained. In the position illustrated in Fig. 1 the fuel chamber is adjusted to its lowermost position. Moreover, the fuel level itself is capable of adjustment, for in the present instance the feed pipe in which the needle-valve seats may be adjusted vertically by screwing in or out, with the result that when such pipe is adjusted upwardly the fuel level is correspondingly raised and when the pipe is adjusted inwardly the fuel level is correspondingly lowered. However, after the proper or desired fuel level is ascertained, this pipe is locked or fixed in position by the lock nut.

My carbureter is particularly advantageous and useful in connection with explosion engines or motors of the portable type, such as the engines or motors of automobiles, where the carbureters are liable to be inclined to the horizontal in going up and down hill, with the result that in carbureters as now used, not embodying my invention, the air is either "starved" or "flooded" with fuel, due to the fact that when the carbureter is tilted in one direction the single vaporizing nozzle of such prior carbureters is raised above the fuel level, thereby interfering with or stopping vaporization, and when tilted in the other direction the nozzle becomes submerged, thereby flooding the nozzle and improperly enriching the gas. However, in my carbureter, these objections cannot exist to affect the operation of the motor, inasmuch as a plurality of vaporizing nozzles or jets and mixing chambers or tubes, arranged substantially as shown, are employed, with the result that whenever the carbureter is tilted in one direction or the other no "starving" or "flooding" of the air can take place, for while some of these nozzles would become "flooded" a corresponding number would become "starved." For instance, referring to Figs. 2 and 4, when the top of the carbureter is tilted to the left, the nozzles on the right hand side in both groups will rise above the fuel level which, of course, remains substantially the same and horizontal, while the nozzles on the left in both groups will fall below the fuel level and thereby be flooded. Some of the nozzles at or near the middle line will remain constant as respects the fuel level. In this manner, the quality of the gas as supplied by the carbureter is kept constant or uniform regardless of the service conditions encountered as just described. Moreover, in case of a tilting of the carbureter in a direction at right angles to that referred to, the quality of the gas will likewise be maintained, the only difference in the conditions being that all of the nozzles of one group would rise above the fuel level and all of the nozzles of the other group would fall therebelow.

My carbureter is not only compact, but has provision for ready assembling and taking apart and the lower cap is particularly easy of attachment to and detachment from the body of the carbureter, which is secured to some fixed support, with the result that such cap, together with the entire fuel chamber and nozzles, may, with extreme facility, be bodily removed for purposes of inspection, repair or cleaning after simply unloosening and swinging the clamping bolts. Furthermore, in case any of the nozzles should become clogged or should work improperly, they may be readily cleaned or be removed and others substituted. These nozzles may all be of the same bore, or of different bores, and such varied sizes of nozzles may be distributed throughout the groups in the manner suited to give the best results for any particular type or make of engine or motor. These nozzles are preferably numbered according to their bore to insure the substitution of a nozzle of the same bore when desired.

The valve mechanism is, by preference, adapted to coöperate with a scale to indicate to the operator the particular position thereof at any time and to thereby indicate whether the damper valve only is operative or the series of mixing tubes, and to indicate, as well, the number of such tubes in service. It will be understood that this scale may be located in any desired locality so long as it coöperates with the valve mechanism and indicates the position of its valve. In the present instance, as shown in Fig. 18, I have illustrated such scale on the top of the carbureter itself, although it is obvious that it may be located elsewhere in coöperation with the controlling lever. As herein shown, the scale 61 has the indication "damper valve" to indicate the positions when the supplemental valve (in practice called the "damper valve") is in service, and also has the indications which, for the purposes of the carbureter herein illustrated, begin with the number 2 and run successively to 12, in correspondence with the mixing chambers or tubes.

An indicator or pointer 62 is mounted on the hub of the supplemental valve in such manner as to coöperate with the scale. When the indicator points to the mark 61ª, the supplemental valve is in normal or closed position with the small damper valve, which it carries, in service. When the indicator is moved in anti-clockwise direction until it points to the mark "2" of the scale, the supplemental valve will have cleared or substantially cleared the outlet port 46, at which time two of the mixing tubes or chambers are in service. Continued movement of the valves will open or bring additional mixing tubes into service and the number thereof will be indicated by the pointer. When the valve mechanism is in full open position the indicator will point to "12" on the scale, inasmuch as the entire twelve mixing tubes are then in service.

While in the particular mechanical habiliment of my invention as herein shown, the mixing chambers are tubes and are so designated throughout the foregoing specification, yet it will be understood that my invention in its broader aspect is not to be limited to such particular form but that such mixing chambers may partake of other forms.

I claim:

1. A carbureter having a plurality of vaporizing nozzles communicating with a common source of fuel and arranged in a circle, and a rotary disk valve for cutting one or more of the nozzles into and out of service at the will of the operator.

2. A carbureter having a fuel chamber or reservoir, a plurality of vaporizing or aspirating nozzles communicating with the common source of fuel therein and arranged concentric of such reservoir, and a rotary disk valve for cutting one or more of the nozzles into and out of service at the will of the operator.

3. A carbureter having a fuel chamber or reservoir, a plurality of vaporizing or aspirating nozzles communicating with the common source of fuel therein, and arranged in two separate groups, and a rotary disk valve for cutting one or more of the nozzles of the two groups into and out of service at the will of the operator.

4. A carbureter having a fuel chamber or reservoir, a plurality of vaporizing or aspirating nozzles communicating with the common source of fuel therein and arrranged concentric of such reservoir, in two separate groups, and a rotary disk valve for cutting one or more of the nozzles of the two groups into and out of service at the will of the operator.

5. A carbureter having a plurality of vaporizing nozzles arranged in groups, and a valve for cutting the nozzles in or out of service alternately in the groups.

6. A carbureter having a plurality of vaporizing nozzles arranged in groups, a corresponding series of mixing tubes therefor, and a valve governing said tubes and arranged to cut the nozzles in or out of service alternately in the groups.

7. A carbureter having a fuel chamber, and a series of vaporizing nozzles communicating therewith and arranged concentric thereof and a valve for cutting the nozzles in or out of service alternately on opposite sides of the fuel chamber.

8. A carbureter having a fuel chamber, and a series of vaporizing nozzles communicating therewith and arranged in groups concentric thereof and a valve for cutting the nozzles in or out of service alternately into groups.

9. A carbureter having a fuel chamber, and a series of vaporizing nozzles communicating therewith and arranged in two groups on opposite sides thereof.

10. A carbureter having a fuel chamber, a series of vaporizing nozzles communicating therewith and arranged in two groups on opposite sides thereof, and a valve for controlling the action of such nozzles.

11. A carbureter having a cylindrical fuel chamber, a series of vaporizing nozzles communicating therewith and arranged in two groups on opposite sides thereof and concentric therewith, and a valve for controlling the action of such nozzles.

12. A carbureter having a cylindrical fuel chamber, a series of vaporizing nozzles communicating therewith and arranged in two groups on opposite sides thereof and concentric therewith, a corresponding series of mixing tubes, and means for controlling the delivery ends of such tubes.

13. A carbureter having a cylindrical fuel chamber, a series of vaporizing nozzles communicating therewith and arranged in two groups on opposite sides thereof and concentric therewith, a corresponding series of mixing tubes, means for controlling the delivery ends of such tubes, and means for controlling the admission of air in the inlet ends of the tubes.

14. A carbureter having a cylindrical fuel chamber, a series of vaporizing nozzles communicating therewith and arranged in two groups on opposite sides thereof and concentric therewith, a corresponding series of mixing tubes, means for controlling the delivery ends of such tubes, and means for controlling in unison the admission of air in the inlet ends of all the tubes.

15. A carbureter having a cylindrical fuel chamber, a series of vaporizing nozzles communicating therewith and arranged in two groups on opposite sides thereof and concentric therewith, a corresponding series of mixing tubes, and valve mechanism controlling the delivery ends of such tubes and arranged to open or close the tubes alternately in the groups.

16. A carbureter comprising a casing, a fuel chamber arranged therein, a series of nozzles communicating with the chamber and extending vertically extraneous of the casing, with spearate radial connections with the fuel chamber, and means for controlling the action of said nozzles, the nozzles being arranged concentric of the fuel chamber.

17. A carbureter comprising a casing, a fuel chamber arranged therein, a series of nozzles communicating with the chamber and extending vertically extraneous of the casing, said nozzles being arranged in two groups on opposite sides of the casing, and means for controlling the action of said nozzles.

18. A carbureter comprising a casing having lateral end-flanges, a fuel chamber within the casing, a series of mixing tubes arranged concentric of the casing with their ends passing through the flanges, and a corresponding series of nozzles communicating with the fuel chamber and coöperating with the tubes.

19. A carbureter comprising a casing having lateral end-flanges, a fuel chamber within the casing, a series of mixing tubes arranged concentric of the casing with their ends passing through the flanges, a corresponding series of nozzles communicating with the fuel chamber and coöperating with the tubes, top and bottom caps for the casing, and valve mechanism arranged between the top cap and the casing for controlling the gas from the tubes.

20. A carbureter comprising a casing, a fuel chamber arranged therein and adapted to be adjusted in position relative thereto, a series of nozzles communicating with the chamber, and means for controlling the action of such nozzles.

21. A carbureter comprising a casing, a fuel chamber arranged therein and having means for maintaining a predetermined fuel level, means for adjusting the position of the fuel chamber vertically with respect to the casing, a series of nozzles communicating with the chamber, and means for controlling the action of such nozzles.

22. A carbureter comprising a casing, a fuel chamber arranged therein and having means for maintaining a predetermined fuel level comprising a float actuated valve governing an inlet from a source of fuel, means for adjusting the position of the fuel chamber vertically with respect to the casing, a series of nozzles communicating with the chamber, and means for controlling the action of such nozzles.

23. A carbureter comprising a casing, a fuel chamber arranged therein and having means for maintaining a predetermined fuel level, a bottom cap for the casing and having an opening, a nut in said opening, a depending extension on the fuel chamber engaged by said nut, whereby rotation of the nut will adjust the fuel chamber up or down according to the direction of rotation, a series of nozzles communicating with the fuel chamber, and means for controlling the action of such nozzles.

24. A carbureter comprising a casing, a fuel chamber arranged therein and having means for maintaining a predetermined fuel level, a bottom cap for the casing and having an opening, a nut in said opening, a depending extension on the fuel chamber engaged by said nut whose rotation adjusts the position of the fuel chamber, said extension having a valve governed drain passage, and nozzles communicating with the fuel chamber.

25. A carbureter comprising a casing, a fuel chamber arranged therein and having means for vaporizing the fuel, an extension depending from the chamber and provided with a valve governed drain passage, said extension passing through the bottom of the casing, a float actuated inlet-valve governing the supply of fuel to the chamber, and a guide rod depending from the float and entering said passage.

26. A carbureter comprising a fuel chamber having a plurality of independent lateral passages 21 communicating therewith, a corresponding series of vertical nozzles communicating with said passages and extending upwardly, said nozzles being concentric of the fuel chamber, a series of separate mixing tubes coöperating with the nozzles and a rotary disk valve for governing said nozzles.

27. A carbureter comprising a cylindrical fuel chamber having a plurality of independent lateral passages 21 communicating therewith, and arranged in two groups on opposite sides of the chamber, vertical nozzles communicating with the passages, a corresponding series of separate mixing tubes coöperating with the nozzles and a rotary disk valve for governing said nozzles.

28. A carbureter comprising a cylindrical fuel chamber having a plurality of lateral passages 21 communicating therewith and extending substantially radial of the chamber, vertical nozzles communicating with the passages, and a corresponding series of separate mixing tubes coöperating with the nozzles.

29. A carbureter comprising a cylindrical fuel chamber having a plurality of lateral passages 21 communicating therewith and arranged in two groups on opposite sides of the chamber, said passages being substantially radial of the chamber, vertical nozzles communicating with the passages and arranged concentric with the fuel chamber, and mixing tubes coöperating with the nozzles.

30. A carbureter having a fuel chamber, a series of vaporizing nozzles communicating therewith and arranged concentric with said chamber, valve mechanism for controlling the action of such nozzles, a corresponding series of mixing tubes coöperating with the nozzles, and means for controlling the admission of air in the inlet ends of the tubes comprising a ring 26 having a series of openings adapted to be moved into and out of register with said tubes, and means for adjusting the position of said ring.

31. A carbureter having a fuel chamber, a series of vaporizing nozzles communicating therewith and arranged concentric with said chamber, valve mechanism for controlling the action of such nozzles, a corresponding series of mixing tubes coöperating with the nozzles, and means for controlling the admission of air in the inlet ends of the tubes comprising a ring 26 having a series of openings adapted to be moved into and out of register with said tubes, and an adjusting screw coöperating with the ring to adjust the position thereof.

32. A carbureter having a fuel chamber, a series of vaporizing nozzles communicating therewith and arranged concentric with said chamber, valve mechanism for controlling the action of such nozzles, a corresponding series of mixing tubes coöperating with the nozzles, and means for controlling the admission of air in the inlet ends of the tubes comprising a ring 26 having a series of openings adapted to be moved into and out of register with said tubes, a casing for the fuel chamber, and an adjusting screw bearing in said casing and engaging the ring to adjust its position.

33. A carbureter having a fuel chamber, a series of vaporizing nozzles communicating therewith and arranged concentric with said chamber, valve mechanism for controlling the action of such nozzles, a corresponding series of mixing tubes coöperating with the nozzles, and means for controlling the admission of air in the inlet ends of the tubes comprising a ring 26 having a series of openings adapted to be moved into and out of register with said tubes, a casing for the fuel chamber and provided with a curved slot, a lug projecting from the ring and passing through said slot, and an adjusting screw bearing in the casing and engaging said lug to adjust its position when the screw is turned.

34. A carbureter having a fuel chamber, a series of vaporizing nozzles communicating therewith and arranged concentric with said chamber, valve mechanism for controlling the action of such nozzles, a corresponding series of mixing tubes coöperating with the nozzles, and means for controlling the admission of air in the inlet ends of the tubes comprising a ring 26 having a series of openings adapted to be moved into and out of register with said tubes, said openings having side slots to accommodate the nozzles, and means for adjusting the position of said ring.

35. A carbureter having a fuel chamber provided with a vaporizing nozzle, a mixing tube into which such nozzle projects, and a gage extraneous of the tube for indicating the position of the upper end of the nozzle.

36. A carbureter comprising a casing, a fuel chamber therein having a series of lateral extensions having fuel passages, a series of nozzles communicating with such passages and projecting upwardly, mixing tubes into which the nozzles project, and a gage carried by said extensions to indicate the position of the upper ends of the nozzles.

37. A carbureter comprising a casing, a fuel chamber arranged therein and having means for maintaining a predetermined fuel level, means for adjusting the position of the fuel chamber vertically with respect to the casing, a series of nozzles communicating with the chamber, a series of mixing tubes into which the nozzles extend, and a gage or indicator for indicating the position of the upper ends of the nozzles.

38. A carbureter comprising a casing, a fuel chamber arranged therein and having means for maintaining a predetermined fuel level, said casing having a mark indicating the fuel level of its chamber, means for adjusting the position of the fuel chamber vertically with respect to the casing, a series of nozzles communicating with the chamber, a series of mixing tubes into which the nozzles extend, and a gage carried by the fuel chamber and coöperating with the said mark on the casing, said gage terminating on the same plane as the upper ends of the nozzles and visually indicating said plane.

39. A carbureter comprising a shell or casing, a fuel chamber therein, a series of vaporizing nozzles communicating with the chamber, a series of mixing tubes for the nozzles, and a valve governing the delivery ends of the tubes and comprising a disk having a marginal recess whereby the tubes may be opened in succession.

40. A carbureter comprising a shell or casing, a fuel chamber therein, a series of vaporizing nozzles communicating with the chamber, a series of mixing tubes for the nozzles, and a valve governing the delivery ends of the tubes and comprising a disk having marginal recesses on opposite sides whereby the tubes may be uncovered or opened.

41. A carbureter comprising a shell or casing, a fuel chamber therein, a series of parallel vaporizing nozzles communicating with the chamber and arranged in groups concentric with the fuel chamber, a corresponding series of parallel mixing tubes for the nozzles, and a valve governing the delivery ends of the tubes and comprising a disk having marginal recesses for governing the respective groups of tubes.

42. A carbureter comprising a shell or casing, a fuel chamber therein, a series of parallel vaporizing nozzles communicating with the chamber and arranged in two groups concentric with the fuel chamber and on opposite sides thereof, a corresponding series of parallel mixing tubes for the nozzles, and a valve governing the delivery ends of the tubes and comprising a rotatable disk having two opposite marginal recesses for governing the two groups of tubes.

43. A carbureter comprising a shell or casing, a fuel chamber therein, a series of parallel vaporizing nozzles communicating with the chamber and arranged in two groups concentric with the fuel chamber and on opposite sides thereof, a corresponding series of parallel mixing tubes for the nozzles, and a valve governing the delivery ends of the tubes and comprising a rotatable disk having two opposite marginal recesses for governing the two groups of tubes, and means for regulating the degree of rotation or oscillation of the disk.

44. A carbureter comprising a shell or casing, a fuel chamber therein, a series of parallel vaporizing nozzles communicating with the chamber and arranged in two groups concentric with the fuel chamber and on opposite sides thereof, a corresponding series of parallel mixing tubes for the nozzles, and a valve governing the delivery ends of the tubes and comprising a rotatable disk having two opposite marginal recesses for governing the two groups of tubes, and stops for limiting the degree of oscillation of the disk, one of such stops being adjustable.

45. A carbureter comprising a shell or casing, a fuel chamber therein, a series of parallel vaporizing nozzles communicating with the chamber and arranged in two groups concentric with the fuel chamber and on opposite sides thereof, a corresponding series of parallel mixing tubes for the nozzles, and a valve governing the delivery ends of the tubes and comprising a rotatable disk having two opposite marginal recesses for governing the two groups of tubes, and means whereby any predetermined number of said tubes may be left constantly open in the normal position of the valve.

46. A carbureter comprising a shell or casing, a fuel chamber therein, a series of parallel vaporizing nozzles communicating with the chamber and arranged in two groups concentric with the fuel chamber and on opposite sides thereof, a corresponding series of parallel mixing tubes for the nozzles, and a valve governing the delivery ends of the tubes and comprising a rotatable disk having two opposite marginal recesses for governing the two groups of tubes, and means for regulating the degree of oscillation of the disk consisting of an adjustable plate received by a surface recess in the disk.

47. A carbureter comprising a shell or casing, a fuel chamber therein, a series of parallel vaporizing nozzles communicating with the chamber and arranged in two groups concentric with the fuel chamber and on opposite sides thereof, a corresponding series of parallel mixing tubes for the nozzles, and a valve governing the delivery ends of the tubes and comprising a rotatable disk having two opposite marginal recesses for governing the two groups of tubes, and means for regulating the degree of oscillation of the disk consisting of a plate having slots, one of which has indications showing how many of the tubes will be left open according to the particular adjustment, and screws received by the slots.

48. A carbureter comprising a shell or casing, a fuel chamber therein, a series of parallel vaporizing nozzles communicating with the chamber and arranged in two groups concentric with the fuel chamber and on opposite sides thereof, a corresponding series of parallel mixing tubes for the nozzles, and a valve governing the delivery ends of the tubes and comprising a rotatable disk having two opposite marginal recesses for governing the two groups of tubes, and means for regulating the degree of oscillation of the disk consisting of a plate having slots, one of which has indications showing how many of the tubes will be left open according to the particular adjustment, and screws received by the slots, one end of the plate forming a stop for the valve in moving in one direction, and a fixed stop for limiting the movement of the valve in the other direction.

49. A carbureter comprising a shell or casing having a gas outlet, a fuel chamber therein, a series of vaporizing nozzles communicating therewith, a series of mixing tubes terminating at one end of the casing and coöperating with the nozzles, and valve mechanism comprising a main valve governing said tubes, and a supplemental valve coöperating with the main valve and directly governing said gas outlet.

50. A carbureter comprising a shell or casing having a gas outlet, a fuel chamber therein, a series of vaporizing nozzles communicating therewith, a series of mixing tubes terminating at one end of the casing and coöperating with the nozzles, and valve mechanism comprising a main valve governing said tubes, and a supplemental valve coöperating with the main valve and adapted to directly govern said gas outlet, said supplemental valve having means for permitting a restricted flow of gas when the valve itself is closed.

51. A carbureter comprising a shell or casing having a gas outlet, a fuel chamber therein, a series of vaporizing nozzles communicating therewith, a series of mixing tubes terminating at one end of the casing and coöperating with the nozzles, and valve mechanism comprising a main valve governing said tubes, and a supplemental valve coöperating with the main valve and adapted to directly govern said gas outlet, said supplemental valve having adjustable means for permitting a restricted flow of gas when the valve itself is closed.

52. A carbureter comprising a shell or casing having a gas outlet, a fuel chamber therein, a series of vaporizing nozzles communicating therewith, a series of mixing tubes terminating at one end of the casing and coöperating with the nozzles, and valve mechanism comprising a main valve governing said tubes, and a supplemental valve coöperating with the main valve and adapted to directly govern said gas outlet, said supplemental valve having a damper valve for regulating the flow of gas through itself.

53. A carbureter comprising a shell or casing having a gas outlet, a fuel chamber therein, a series of vaporizing nozzles communicating therewith, a series of mixing tubes terminating at one end of the casing and coöperating with the nozzles, and valve mechanism comprising a disk valve having marginal recesses and arranged to govern said tubes, and a segment-shaped valve coöperating with the main valve to govern said gas outlet.

54. A carbureter comprising a shell or casing having a gas outlet, a fuel chamber therein, a series of vaporizing nozzles communicating therewith, a series of mixing tubes terminating at one end of the casing and coöperating with the nozzles, and valve mechanism comprising a disk valve governing said tubes, and a segment-shaped valve governing said outlet and coöperating with and actuating the main valve.

55. A carbureter comprising a shell or casing having a gas outlet, a fuel chamber therein, a series of vaporizing nozzles communicating therewith, a series of mixing tubes terminating at one end of the casing and coöperating with the nozzles, and valve mechanism comprising a main valve governing said tubes, a supplemental valve governing said outlet, and means controlled by the latter valve for locking the main valve in normal position.

56. A carbureter comprising a shell or casing having a gas outlet, a fuel chamber therein, a series of vaporizing nozzles communicating therewith, a series of mixing tubes terminating at one end of the casing and coöperating with the nozzles, and valve mechanism comprising a main valve governing said tubes, a supplemental valve governing said outlet, and means controlled by the latter valve for locking the main valve in normal position comprising a slotted plate, a swinging stud pivoted on the main valve and normally within the slot of the plate to prevent oscillation of the main valve, the supplemental valve having means for holding the stud in locking position.

57. A carbureter comprising a shell or casing having a gas outlet, a fuel chamber therein, a series of vaporizing nozzles communicating therewith, a series of mixing tubes terminating at one end of the casing and coöperating with the nozzles, and valve mechanism comprising a main valve governing said tubes, a supplemental valve governing said outlet, and means controlled by the latter valve for locking the main valve in normal position comprising a plate with a slot, a swinging stud pivoted on the main valve and normally within such slot to prevent oscillation of the main valve, the supplemental valve having means for holding the stud in the slot when in one position and for withdrawing it therefrom and actuating the main valve when in another position.

58. A carbureter comprising a shell or casing having a gas outlet, a fuel chamber therein, a series of vaporizing nozzles communicating therewith, a series of mixing tubes terminating at one end of the casing and coöperating with the nozzles, and valve mechanism comprising a main valve governing said tubes, a supplemental valve governing said outlet, and means controlled by the latter valve for locking the main valve in normal position comprising a plate with a slot, a swinging stud pivoted on the main valve and normally within such slot to prevent oscillation of the main valve, the supplemental valve having a segment portion $42^b$ to hold said stud in the slot and also having a hook $42^c$ for withdrawing it therefrom.

59. A carbureter comprising a shell or casing having a gas outlet, a fuel chamber therein, a series of vaporizing nozzles communicating therewith, a series of mixing tubes terminating at one end of the casing and coöperating with the nozzles, and valve mechanism comprising a main valve governing said tubes, a supplemental valve governing said outlet, and means controlled by the latter valve for locking the main valve in normal position comprising a plate with a slot, a swinging stud pivoted on the main valve and normally within such valve, the supplemental valve having a segment portion $42^b$ arranged to bear against the stud and hold it in its slot and also having a hook $42^c$ and recess $42^d$ whereby said stud may be withdrawn from its slot when engaged by said hook.

60. A carbureter comprising a shell or casing having a gas outlet, a fuel chamber therein, a series of vaporizing nozzles communicating therewith, a series of mixing tubes terminating at one end of the casing and coöperating with the nozzles, and valve mechanism comprising a main valve governing said tubes, a supplemental valve governing said outlet, and means controlled by the latter valve for locking the main valve in normal position comprising a plate, with a slot, a link 49 pivoted on the main valve and carrying a stud 50 at its outer end, which stud is received in said slot, said supplemental valve having a segment portion 42$^b$ coöperating with the stud to hold it in the slot, and also having a hook to withdraw such stud from its slot.

61. A carbureter having a plurality of parallel vaporizing nozzles, a corresponding series of parallel mixing tubes coöperating therewith and arranged on the circumference of a circle, and valve mechanism controlling said tubes and arranged to open and close said tubes one at a time.

62. A carbureter having a plurality of vaporizing nozzles arranged in groups and parallel to each other, a corresponding series of mixing tubes coöperating therewith, and valve mechanism controlling said tubes and arranged to open and close said tubes alternately in the groups.

63. A carbureter comprising a fuel chamber having a plurality of vaporizing nozzles arranged in two groups on opposite sides of the fuel chamber and concentric therewith, a corresponding series of mixing tubes coöperating with the nozzles, and a valve controlling said tubes and arranged to open the tubes of one group successively in one direction and to open the tubes of the other group successively in the other direction.

64. A carbureter comprising a casing, a fuel chamber therein, a vaporizing nozzle communicating with the fuel chamber, a mixing chamber with which such nozzle coöperates, and means for visually indicating the top of the nozzle.

65. A carbureter comprising a casing, a fuel chamber therein, a vaporizing nozzle communicating with the fuel chamber, a mixing chamber with which such nozzle coöperates, and a rod of the same height as the nozzle and extending extraneous of the casing to indicate the top of the nozzle.

66. A carbureter comprising a casing, a fuel chamber therein, a vaporizing nozzle communicating with the fuel chamber, a mixing chamber with which such nozzle coöperates, said casing having on its outer side a mark indicating the fuel level in the fuel chamber within, and a rod of the same height as the nozzle and extending extraneous of the casing and coöperating with said mark thereon to indicate the top of the nozzle.

67. A carbureter comprising a casing, a fuel chamber adjustable therein, a series of mixing tubes, a corresponding series of vaporizing nozzles communicating with such chamber and coöperating with said tubes, and a rod carried by said fuel chamber and extending extraneous of the casing to indicate the top of the nozzles.

68. A carbureter comprising a casing having lateral end flanges, mixing tubes arranged between and extending through said flanges, a fuel chamber arranged within the body of the casing and adjustable therein, a series of vaporizing nozzles carried by and communicating with the fuel chamber and extending into the mixing tubes, and a visual indication for indicating the top plane of the nozzles while in the tubes.

69. A carbureter comprising a casing having lateral end flanges, mixing tubes arranged between and extending through said flanges, a fuel chamber arranged within the body of the casing and adjustable therein, a series of vaporizing nozzles carried by and communicating with the fuel chamber and extending into the mixing tubes, and a rod also carried by the fuel chamber and arranged to indicate the top plane of the nozzles while in the tubes.

70. A carbureter comprising a casing having lateral end flanges, mixing tubes arranged between and extending through said flanges, a fuel chamber arranged within the body of the casing and adjustable therein, a series of vaporizing nozzles carried by and communicating with the fuel chamber and extending into the mixing tubes, and a rod also carried by the fuel chamber and passing through the lower flange of the casing and parallel to the nozzles to indicate the height of the latter within such tubes.

71. A carbureter having a plurality of vaporizing nozzles having independent supply connections, a corresponding plurality of mixing tubes with which such nozzles coöperate and valve mechanism common to all the tubes for governing them.

HOWARD SMALL.

Witnesses:
S. E. HIBBEN,
LOUIS B. ERWIN.